United States Patent [19]

Bolin

[11] 4,166,194

[45] Aug. 28, 1979

[54] GAS-INSULATED BUSHING WITH SELF-ADJUSTING BUSHING FLANGE SEAL

[75] Inventor: Philip C. Bolin, Westborough, Mass.

[73] Assignee: Westinghouse Electric Corp., Pittsburgh, Pa.

[21] Appl. No.: 823,481

[22] Filed: Aug. 10, 1977

[51] Int. Cl.² ...................... H01B 17/30; H02G 15/22
[52] U.S. Cl. .................................... 174/31 R; 174/19; 174/77 R; 174/142
[58] Field of Search ........ 174/11 BH, 12 BH, 14 BH, 174/15 BH, 16 BH, 18, 19, 20, 31 R, 31.5, 75 R, 75 D, 75 F, 77 R, 80, 142, 143, 150, 152 R, 163 R, 167

[56] References Cited

U.S. PATENT DOCUMENTS

| | | | |
|---|---|---|---|
| 2,289,164 | 7/1942 | Arnold et al. | 174/163 R X |
| 3,760,089 | 9/1973 | Hildenbrand et al. | 174/31 R X |
| 3,934,071 | 1/1976 | Tahiliani | 174/31 R |

Primary Examiner—Laramie E. Askin
Attorney, Agent, or Firm—M. S. Yatsko

[57] ABSTRACT

A gas filled bushing having an insulating shell and a centrally disposed bushing conductor. Flexible means integrally formed with the flange ring are utilized to control the compression of sealing means against the insulating shell to minimize the leakage of gas through the joint between the flange ring and the porcelain or epoxy insulating shell, without using excessive force which might break the insulating shell.

9 Claims, 3 Drawing Figures

GAS-INSULATED BUSHING WITH SELF-ADJUSTING BUSHING FLANGE SEAL

BACKGROUND OF THE INVENTION

This invention relates generally to gas-insulated equipment, and more particularly to a gas-filled bushing utilizing a self-adjusting bushing flange seal.

Gas-insulated equipment is being used in an ever increasing scale in recent years due to the desirablility of increasing safety, problems in acquiring the necessary acreage for substations and right-of-way for overhead lines, higher power requirements of growing metropolitan areas, and the overall growing demands for electrical energy. Typical of such installation are gas-insulated, high-voltage substations dealing with voltages of magnitudes such as 500,000 volts and higher with main components such as circuit breakers, switches, and the like enclosed in gas-filled grounded metal containers which are interconnected by elongated conductors which also are contained in outer grounded sheaths filled with the insulating gas. Typical of the gas utilized in these substations is sulfur hexafluoride whose high dielectric strength minimizes the separation distance required between adjacent electrical components, to thereby decrease the size of the equipment.

Generally, whenever utilizing gas-insulated equipment, it is necessary to provide an air entrance bushing to make the connection from an overhead line, for example, to the central gas-insulated conductor of the gas-insulated bus. Presently, these bushings generally consist of an elongated porcelain or epoxy body of tapering or straight diameter with suitable corona rings at the ends of the body to allow adequate flaring of dielectric potential lines.

Because these bushings are of porcelain or epoxy material, welding or brazing of these bushing shells to interconnect them with the gas-insulated system is inapplicable or difficult. However, the securing of these bodies to the remainder of the system requires a gas-tight seal, for otherwise the gas disposed within the bushing or within the system could escape through such connection thereby decreasing the dielectric strength of the system. A prior practice has been to utilize seals disposed between the bushing shell and the flange to which it is secured by cement to prevent the escape of the insulating gas. However, problems have arisen with the use of such seals. Both the flange weldment and the bushing shell require very flat and accurate surfaces at the location of the seal to prevent the escape of the insulating gas, which is difficult to achieve. One method of compensating for this is to force the seals into greater compression between the bushing shell and the flange; however, care must be asserted when compressing this seal, for too much pressure may cause the porcelain or epoxy bushing shell to crack. Therefore, what is desirable is to provide a means for controlling the compression force of the seals against the bushing shell without increasing the probability of cracking the shell or shearing the flange off, and without requiring close and expensive dimensional tolerances of all components.

SUMMARY OF THE INVENTION

It has been found that a more desirable gas-insulated bushing is achieved by providing a hollow gas filled insulating shell with first and second end portions, and a bushing conductor extending along the axis of the shell and having one end thereof fixed to the shell. A flange ring has a central opening and is secured to the opposite end of the insulating shell, with the flange ring and the insulation shell forming a joint therebetween. Sealing means are disposed on the flange ring between the flange ring and the insulating shell for minimizing the passage of gas through the joint, and flexible means formed with the flange rings are provided for controlling the compression of the sealing means against the insulation shell.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
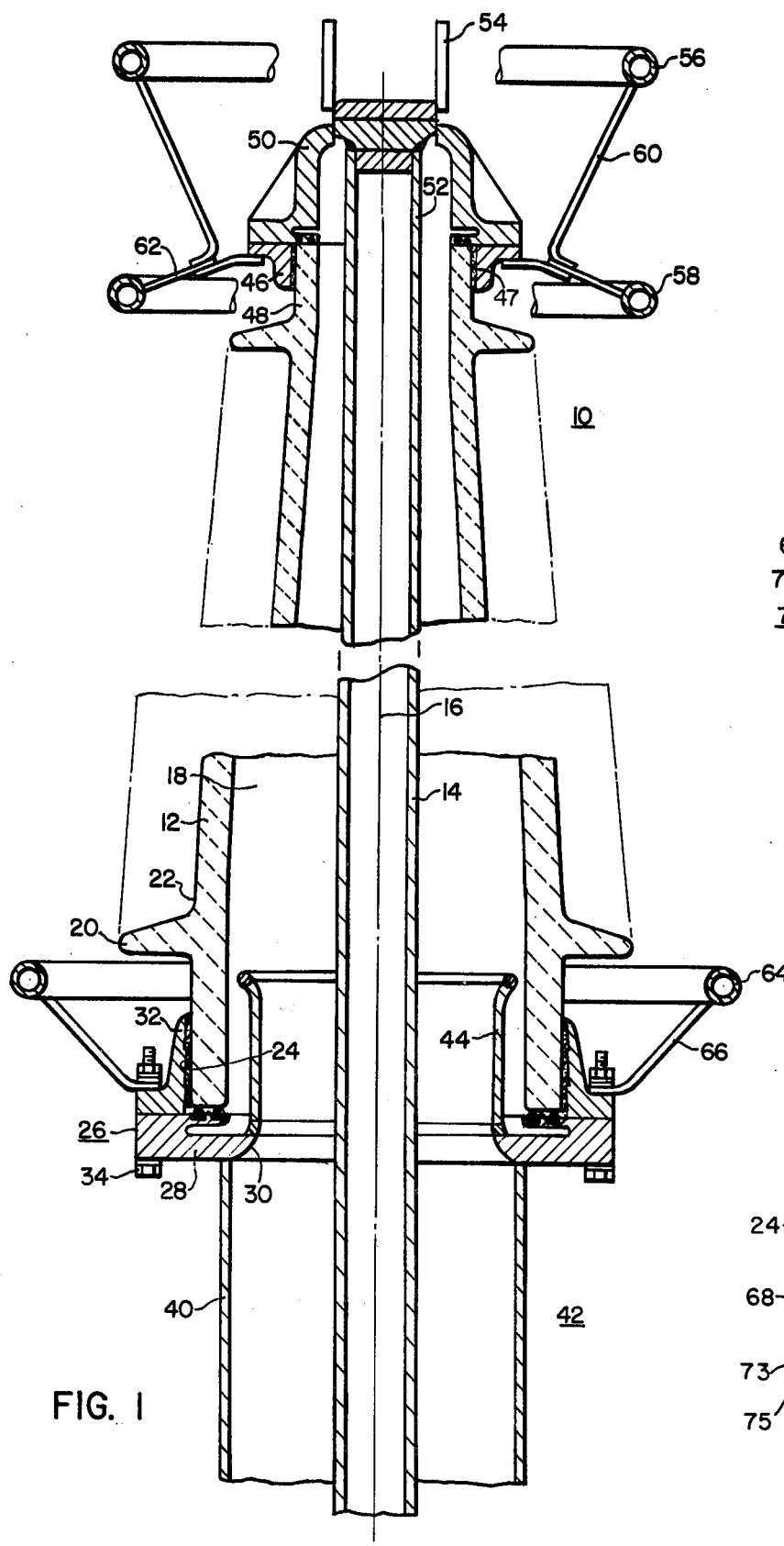
FIG. 1 is a cross-sectional view of a gas-filled bushing utilizing the teachings of this invention.

In accordance with this invention, the gas-filled bushing 10 illustrated in FIG. 1 comprises a hollow, elongated insulating shell 12, a central bushing conductor 14 extending along the axis 16 of the insulating shell 12, and an insulating gas 18 disposed within the insulating shell 12 and which typically may be sulfur hexafluoride. The insulating shell 12, which may be of porcelain or epoxy, has a plurality of skirts 20 along the outer surface 22 thereof, and is typically of a conically-tapering cross-section. The shell 12 is secured, at end portion 24, to a flange ring 26. The flange ring 26 is comprised of a generally planar, cylindrical base member 28 having a central opening 30 therethrough, and a longitudinal extension 32 which is secured to the base member 28 by means such as bolts 34. The longitudinal extension 32 is disposed adjacent the outer surface 36 (see FIG. 2) of the end portion 24 of the insulating shell 12. A cement 38 is disposed between the longitudinal extension 32 and the end portion 24, with the cement 38 securing the end portion 24 and thereby the insulating shell 12 to the longitudinal extension 32. The base member 28 and the longitudinal extension 32 are of an electrically conducting material, and typically the base member 28 is secured, for example, to the outer sheath 40 of a gas-insulated transmission line 42 to which the gas-filled bushing 10 is connected. As such, the base member 28 and the longitudinal extension 32 are at ground potential. Also secured to the base member 28 is a corona ring 44 which functions to shape the electric field caused by the central conductor 14 as desired.

The upper hardware of the bushing 10 is similar in construction to that of the flexible flange previously described, except that an upper metallic cap 50 or plate is secured to the ring 46 and to the upper end 52 of the bushing conductor 14 instead of having the central opening. A cement 47 is disposed intermediate the cap ring 46 and the insulating shell 12, and secures the cap ring 46 to the top 48 of the insulating shell 12. The upper cap 50 has secured thereto a terminal connector 54 for receiving the ends of overhead lines which may be connected to the bushing 10. Suitable corona rings 56 and 58 are connected to the metallic cap 50 and thereby to the upper end 52 of the bushing conductor 14 by the connection wires 60 and 62. A lower corona ring 64, if desired, is connected to the longitudinal extension 32, and thereby to ground, by the support wires 66.

To minimize, and optimally to prevent, the leakage of the insulating gas 18 from within the insulating shell 12 to the external atmosphere, sealing rings 68 (FIG. 2) are disposed on the base member 28 between the base member 28 and the end portion 24 of the insulating shell 12. As previously described, a similar construction is utilized at the top 48 of the insulating shell, and the following description is likewise applicable to that sealing location. The sealing rings 68, typical of which are O-ring seals, are disposed in circumferential grooves 70 which are cut or machined into the base member 28 adjacent the end portion 24, and the sealing rings 68 extend outwardly from the base member 28 to contact the end portion 24 of the insulating shell 12. To achieve their greatest effectiveness, the sealing rings 68 should bear against the surface of the end portion 24 of the insulating shell 12 with a controlled compression without fracturing the insulation shell 12 or shearing the flange ring 26 off the end portion 24. To achieve this controlled compression, flexible means 72 are included within the flange ring 26 and, more particularly, the base member 28. The flexible means 72 comprise a radial slot 74 which extends outwardly from the base member central opening 30 to a location 76 which is radially outwardly beyond the outermost circumferential groove 70. By being so constructed, the portion 78 of the base member 28 on which the grooves 70 and sealing rings 68 are located is provided with a flexibility which brings the sealing rings 68 into optimum compression against the end portion 24 of the insulating shell without danger of cracking the insulating shell 12. The danger of cracking the insulating shell 12 is eliminated because, if too great a tightening force is exerted by the bolts 34 in attempting to bring the base member 28 against the end portion 24 of the insulating shell 12, the portion 78 of the base member 28 which holds the sealing rings 68 will, instead of bearing against the insulating shell 12 with too much force, flex downward as shown in the illustrations to remain beneath the insulating shell cracking force, but will at the same time maintain the controlled compression of the sealing rings 68 against the insulating shell end portion 24.

Figure 2:
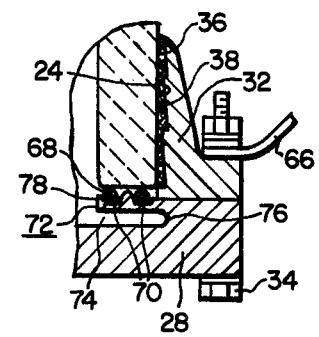
FIG. 2 is a detailed illustration of the bushing flange sealing system.
Figure 3:
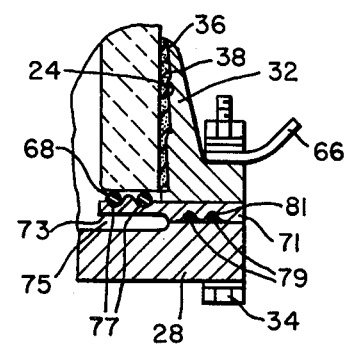
FIG. 3 is a modification of the view of FIG. 2.

FIG. 3 illustrates a modification of the bushing 10 of FIG. 2, in that the base member 28 of the flange ring 26 is flat, and a seal holder 71 is disposed intermediate the base member 28 and the longitudinal extension 32. The seal holder 71 is spaced apart from the base member 28 at some portion 73 thereof underneath said end portion 24 of the insulating shell to form the space 75 corresponding to the slot 74. The seal holder 71 has grooves 77 adjacent the end portion 24 in which the seals 68 are disposed. A pair of seals 79 are also disposed in grooves 81 in the seal holder 71 adjacent the base member 28 to prevent the escape of the insulating gas 18 through this joint. This modification operates similarly to that heretofore described, in that the portion 73 of the seal holder 71 will flex downward into the space 75 to control the compression without cracking the insulating shell 12 upon the occurrence of too great a tightening force.

Thus, it can be seen that this invention provides a self-adjusting bushing flange seal which minimizes the danger of cracking of the porcelain or jacking the flange ring off the insulating shell, and ensures the proper compression of the sealing means.

I claim as my invention:

1. A gas-filled bushing comprising:
   a hollow elongated gas-filled insulating shell having first and second end portions;
   a central bushing conductor extending along the axis of said insulating shell and having one end thereof fixed to said insulating shell first end portion;
   a flange ring having a central opening and secured to said insulating shell second end portion, said flange ring and said insulating shell second end portion forming a joint therebetween, said flange ring having a circumferential groove therein adjacent said insulating shell second end portion;
   sealing means disposed on said flange ring between said flange ring and said insulating shell second end portion for minimizing the passage of gas through said joint, said sealing means comprising a seal disposed within said groove and extending outwardly therefrom and contacting said insulating shell second end portion; and
   flexible means formed with said flange ring for controlling the compression of said sealing means against said insulating shell second end portion, said flexible means comprising said flange ring having a radial slot extending outwardly from said central opening to a location radially outwardly beyond said circumferential groove.

2. The bushing according to claim 1 wherein said insulating shell is a porcelain bushing having skirts on the outer surface thereof, and having a conically-tapering cross-section.

3. The bushing according to claim 1 wherein said insulating shell is an epoxy bushing having skirts on the outer surface thereof, and having a conically-tapering cross-section.

4. The bushing according to claim 1 wherein said flange ring comprises a generally planar, cylindrical base member and a longitudinal extension secured thereto, said longitudinal extension being disposed adjacent the outer surface of said insulating shell second end portion, and a cement is disposed intermediate said longitudinal extension and said insulating shell, said cement securing said insulating shell second end portion to said longitudinal extension.

5. The bushing according to claim 1 wherein said insulating shell and said bushing conductor are generally vertically disposed.

6. A gas-filled bushing comprising:
   a hollow elongated gas-filled insulating shell having first and second end portions;
   a central bushing conductor extending along the axis of said insulating shell and having one end thereof fixed to said insulating shell first end portion;
   a flange ring having a central opening and secured to said insulating shell second end portion, said flange ring and said insulating shell second end portion forming a joint therebetween, said flange ring comprising a generally planar, cylindrical base member and a longitudinal extension secured thereto, said longitudinal extension being disposed adjacent the outer surface of said insulating shell second end portion;
   a cement disposed intermediate said longitudinal extension and said insulating shell, said cement securing said insulating shell second end portion to said longitudinal extension;
   sealing means disposed between said flange ring and said insulating shell second end portion for minimizing the passage of gas through said joint;

a seal holder disposed intermediate said base member and said longitudinal extension, said sealing means being disposed on said seal holder; and flexible means formed with said flange ring for controlling the compression of said sealing means against said insulating shell second end portion.

7. The bushing according to claim 6 wherein said flexible means comprises said seal holder being spaced apart from said base member at some portion thereof.

8. A gas-filled bushing comprising:

a hollow elongated gas-filled insulating shell having first and second end portions;

a central bushing conductor extending along the axis of said insulating shell and having one end thereof fixed to said insulating shell first end portion;

a flange ring having a central opening and secured to said insulating shell second end portion, said flange ring and said insulating shell second end portion forming a joint therebetween;

sealing means disposed on said flange ring between said flange ring and said insulating shell second end portion for minimizing the passage of gas through said joint;

flexible means formed with said flange ring for controlling the compression of said sealing means against said insulating shell second end portion;

a cap ring secured to said insulating shell first end portion;

a metallic cap secured to said cap ring and said bushing conductor and disposed adjacent said insulating shell first end portion, said cap having a circumferential groove therein adjacent said insulating shell first end portion;

cap sealing means disposed intermediate said cap and said insulating shell first end portion for minimizing the passage of gas through the joint therebetween, said cap sealing means comprising a seal disposed within said cap groove and extending outwardly therefrom and contacting said insulating shell first end portion; and flexible cap control means integrally formed with said cap for controlling the compression of said cap sealing means against said insulating shell first end portion, said flexible cap control means comprising said cap having a radial slot extending radially outwardly to a location beyond said cap groove.

9. The bushing according to claim 8 wherein said cap ring is disposed adjacent the outer surface of said insulating shell first end portion, and a cement is disposed intermediate said cap ring and said insulating shell, said cement securing said insulating shell first end portion to said cap ring.

* * * * *